United States Patent
Yang et al.

(10) Patent No.: US 11,402,834 B2
(45) Date of Patent: Aug. 2, 2022

(54) METHOD FOR DRAWING MAP OF SPECIFIC AREA, ROBOT AND ELECTRONIC DEVICE IMPLEMENTING THEREOF

(71) Applicant: LG ELECTRONICS INC., Seoul (KR)

(72) Inventors: Sookhyun Yang, Seoul (KR); Gyuho Eoh, Seoul (KR); Joongtae Park, Seoul (KR); Jungsik Kim, Seoul (KR); Dong Ki Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 308 days.

(21) Appl. No.: 16/573,551

(22) Filed: Sep. 17, 2019

(65) Prior Publication Data

US 2020/0379455 A1 Dec. 3, 2020

(30) Foreign Application Priority Data

Jun. 3, 2019 (KR) .......................... 10-2019-0065594

(51) Int. Cl.
*G05D 1/00* (2006.01)
*G01S 17/89* (2020.01)
(Continued)

(52) U.S. Cl.
CPC ............ *G05D 1/0011* (2013.01); *G01S 17/89* (2013.01); *G05D 1/0088* (2013.01);
(Continued)

(58) Field of Classification Search
CPC .. G05D 1/0011; G05D 1/0088; G05D 1/0231; G05D 1/0044; G05D 1/0246;
(Continued)

(56) References Cited

U.S. PATENT DOCUMENTS

| | | | |
|---|---|---|---|
| 2006/0155436 A1* | 7/2006 | Matsunaga | G05D 1/0274 701/25 |
| 2007/0271003 A1* | 11/2007 | Bang | G05D 1/0272 701/23 |

(Continued)

FOREIGN PATENT DOCUMENTS

| | | |
|---|---|---|
| KR | 10-2011-0122022 A | 11/2011 |
| KR | 10-1948728 B1 | 2/2019 |

*Primary Examiner* — Muhammad Shafi
(74) *Attorney, Agent, or Firm* — Birch, Stewart, Kolasch & Birch, LLP

(57) ABSTRACT

Provided are a method for drawing a map of a specific area, a robot and an electronic device that implement such a method. According to the present disclosure, the method, the robot, and the electronic device improve quality of the drawn map by moving the robot so that loop closing is performed many times when the map is drawn. To this end, an accumulated moving distance from a first position and a second position of the robot moving in the specific area is measured, and when the loop closing is not performed at the second position, whether the loop closing is required at the second position is determined based on the measured accumulated moving distance and information on matching of feature points at the second position, and a movement of the robot is controlled based on a result of the determination.

12 Claims, 8 Drawing Sheets

(51) Int. Cl.
  *G05D 1/02*   (2020.01)
  *G06N 3/04*   (2006.01)
  *G06V 10/75*  (2022.01)
  *G06V 20/10*  (2022.01)

(52) U.S. Cl.
  CPC ............ *G05D 1/0231* (2013.01); *G06N 3/04* (2013.01); *G06V 10/751* (2022.01); *G06V 20/10* (2022.01)

(58) Field of Classification Search
  CPC ......... G05D 2201/0207; G05D 1/0274; G05D 1/0257; G05D 1/0268; G05D 1/0272; G01S 17/89; G06K 9/00664; G06K 9/6202; G06K 9/6271; G06N 3/04; G06N 5/003; G06N 7/005; G06N 20/10; G06N 3/08; B25J 9/1602; B25J 9/1664; B25J 9/1694
  USPC ............................................................ 701/2
  See application file for complete search history.

(56) References Cited

U.S. PATENT DOCUMENTS

| | | | | |
|---|---|---|---|---|
| 2011/0268349 | A1* | 11/2011 | Choi ...................... | G06V 20/36 382/153 |
| 2013/0218341 | A1* | 8/2013 | Teng ................... | G05D 1/0234 901/1 |
| 2017/0357266 | A1* | 12/2017 | Yu ............................. | A47L 9/28 |
| 2018/0004217 | A1* | 1/2018 | Biber ................... | G05D 1/0221 |
| 2018/0120852 | A1* | 5/2018 | Cho ....................... | G05D 1/024 |
| 2018/0161986 | A1* | 6/2018 | Kee ........................ | G06V 10/82 |
| 2020/0103529 | A1 | 4/2020 | Yeon et al. | |

\* cited by examiner

METHOD FOR DRAWING MAP OF SPECIFIC AREA, ROBOT AND ELECTRONIC DEVICE IMPLEMENTING THEREOF

CROSS-REFERENCE TO RELATED APPLICATION

This application claims priority to and the benefit of Korean Patent Application No. 10-2019-0065594, filed on Jun. 3, 2019, the disclosure of which is incorporated herein by reference in its entirety.

BACKGROUND

1. Field of the Invention

A method for drawing a map of a specific area, and a robot and an electronic device for implementing such a method is disclosed herein.

2. Description of Related Art

Recently, interests in Simultaneous Localization And Mapping (SLAM) technology have been increasing in the field of mobile robots. The SLAM technology draws a map for a specific area while the robot recognizes its own position without external assistance through a sensor attached to the robot.

The SLAM technology generates precise maps based on revisit scenarios. In other words, the SLAM technology may minimize errors generated by the map by revisiting previously visited points, thereby generating and managing an entire map. Therefore, when the SLAM technology is used, quality of the map may be improved when the number of revisits is increased, and the quality of the map may be degraded when the number of revisits is decreased.

However, unlike a cleaning robot that moves in a small area, a robot that moves in a large area may not revisit or rarely revisits the large area, thereby deteriorating the quality of the map.

SUMMARY OF THE DISCLOSURE

The present disclosure provides a method for drawing a map of a specific area, where the method may enable improving quality of a map when the map of the specific area is drawn, and a robot and an electronic device implementing such a method.

Further, the present disclosure provides a method for drawing a map of a specific area that provides guide information of a trajectory of a robot so that a user who is a non-expert may accurately draw the map of the specific area, and a robot and an electronic device implementing such a method.

The objects of the present disclosure are not limited to the above-mentioned objects, and other objects and advantages of the present disclosure which are not mentioned may be understood by the following description and more clearly understood by the embodiments of the present disclosure. It will also be readily apparent that the objects and advantages of the disclosure may be implemented by features defined in the claims and a combination thereof.

In order to solve the above-mentioned problems, according to an embodiment of the present disclosure, a method for drawing a map of a specific area, and a robot and an electronic device implementing such a method have a technical feature in which the quality of the drawn map is improved by controlling movement of the robot so that loop closing is performed many times when the map is drawn.

According to an embodiment of the present disclosure, a robot that draws a map of a specific area includes a distance measuring unit that measures an accumulated moving distance from a first position to a second position of a robot moving in the specific area, a determining unit that determines whether loop closing is required at the second position using the measured accumulated moving distance and information on matching of feature points at the second position when the loop closing is not performed at the second position, and a controlling unit that controls the movement of the robot based on a result determined by the determining unit.

According to an embodiment of the present disclosure, an electronic device that draws a map of a specific area includes a distance measuring unit that measures an accumulated moving distance from a first position to a second position of an electronic device carried by a user moving in the specific area, a determining unit that determines whether the loop closing is required at the second position using the measured accumulated moving distance, at least one predetermined reference accumulated moving distance, and information on matching of feature points at the second position, when the loop closing is not performed at the second position; and a moving path information generator that generates information on a moving path of the loop closing, when it is determined that the loop closing is required.

According to an embodiment of the present disclosure, a method for drawing, by a robot, a map of a specific area includes measuring, by a distance measuring unit, an accumulated moving distance from a first position to a second position of the robot that moves in a specific area, determining, by a determining unit, whether loop closing is required using the measured accumulated moving distance, at least one predetermined reference accumulated moving distance, and information on matching of feature points at the second position, when the loop closing is not performed at the second position, and controlling, by a controlling unit, movement of the robot based on the result of determination by the determining unit.

According to the present disclosure, it is possible to improve the quality of the map when the map of the specific area is drawn through a greater number of loop closings.

Further, according to the present disclosure, the user who is the non-expert may receive guide information on the trajectory of the robot and may accurately draw the map of the specific area.

Further, according to the present disclosure, it is possible to accurately draw the map of the specific area without using an expensive sensor.

Effects of the present disclosure are not limited to the effects described above, and those skilled in the art of the present disclosure can easily understand various effects of the present disclosure based on the configuration of the present disclosure.

DETAILED DESCRIPTION OF EXEMPLARY IMPLEMENTATIONS

Figure 1:
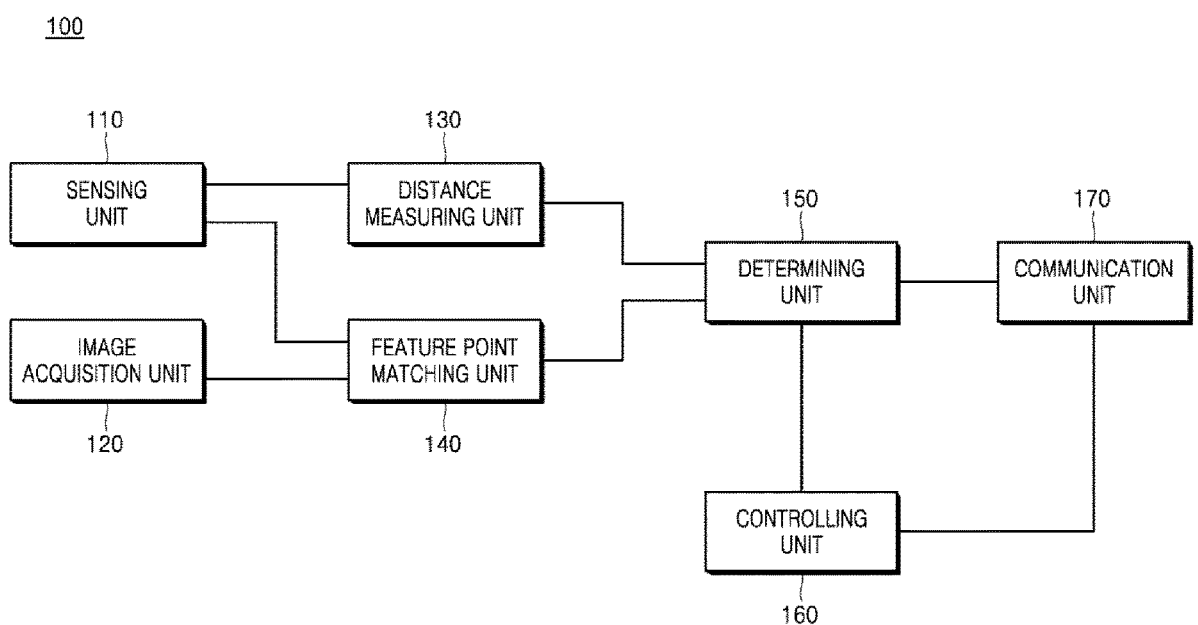
FIG. 1 shows a schematic configuration of a robot according to an embodiment of the present disclosure.

Hereinafter, the embodiments of the present disclosure will be described in detail with reference to the drawings so that those skilled in the art to which the present disclosure pertains can easily implement the present disclosure. The present disclosure may be implemented in many different manners and is not limited to the embodiments described herein.

In order to clearly illustrate the present disclosure, technical explanation that is not directly related to the present disclosure may be omitted, and same or similar components are denoted by a same reference numeral throughout the disclosure. Further, some embodiments of the present disclosure will be described in detail with reference to the exemplary drawings. In adding reference numerals to components of each drawing, the same components may have the same reference numeral as possible even if they are displayed on different drawings. Further, in describing the present disclosure, a detailed description of related known configurations and functions will be omitted when it is determined that it may obscure the gist of this application.

In describing components of the present disclosure, it is possible to use the terms such as first, second, A, B, (a), (b), and the like. These terms are only intended to distinguish a component from another component, and a nature, an order, a sequence, or the number of the corresponding components is not limited by that term. When a component is described as being "connected", "coupled", or "connected" to another component, the component may be directly connected or able to be connected to the other component; however, it is also to be understood that an additional component may be "interposed" between the two components, or the two components may be "connected", "coupled" or "connected" through an additional component.

Further, with respect to implementation of this invention, the present disclosure may be described by subdividing an individual component, the components of the disclosure may be implemented within a device or a module, or a component of the present disclosure may be implemented by being divided into a plurality of devices or modules.

Hereinafter, in the present disclosure, the robot is collectively referred to as a device that performs a specific function and travels in a specific area. The functions performed by the robot include various types of functions a moving device may provide, for example, functions such as cleaning, guidance, mapping, and security functions.

FIG. 1 shows a schematic configuration of a robot according to an embodiment of the present disclosure.

Referring to FIG. 1, according to an exemplary embodiment of the present disclosure, a robot 100 includes a sensing unit 110, an image acquisition unit 120 (or image acquirer), a distance measuring unit 130 (or distance measurer), a feature point matching unit 140 (or feature point matcher), a determining unit 150 (or determiner), a controlling unit 160 (or controller), and a communication unit 170 (or communicator).

At this time, the robot 100 may move in the specific area and may draw a map for the specific area, and preferably, draws a map using Simultaneous Localization And Mapping (SLAM) technology.

Hereinafter, the function for each component will be described in detail.

The sensing unit 110 includes a plurality of sensors such as a sensor that measures a moving distance of the robot 100, a sensor that detects an obstacle, and the like. For example, the sensing unit 110 may include at least one of an acceleration sensor, a gyro sensor, a lidar sensor, an infrared sensor, an ultrasonic sensor, an RF sensor, a geomagnetic sensor, and a Position Sensitive Device (PSD) sensor. In particular, the lidar sensor measures a distance between the robot 100 and an object, and may be a general 2D lidar sensor rather than a 3D lidar sensor.

The image acquisition unit 120 acquires an image of a surrounding environment when the robot 100 moves. For example, the image acquisition unit 120 may include a camera, and the camera may be a general 180° camera rather than a 360° camera.

The distance measuring unit 130 measures an accumulated moving distance of a robot moving in a specific area. For example, the distance measuring unit 120 may measure the accumulated moving distance based on data sensed by an acceleration sensor and a gyro sensor in the sensing unit 110.

The feature point matching unit 140 generates information on matching of feature points based on at least one of sensing data sensed by the sensing unit 110 and an image acquired by the image acquisition unit 120, and matches the feature points based on the above.

For example, the feature point matching unit 140 may perform feature point matching using lidar scan data acquired by the lidar sensor and may perform the feature point matching using the image acquired by the image acquisition unit 120, and may perform the feature point matching using both the lidar scan data and the image.

Meanwhile, according to an embodiment of the present disclosure, the feature point matching unit 140 may perform the feature point matching using an algorithm model based on an artificial neural network. This will be described in more detail below.

The determining unit 150 determines whether loop closing is performed at a current position of the robot 100 and determines whether the loop closing is required using the measured accumulated moving distance when the loop closing is not performed at the current position and the information on matching of the feature points at the current position.

The loop closing is also referred to as "a loop closure", and is used when a map is drawn using the SLAM technology, and refers to a shape of a trajectory of the robot 100 when the robot 100 revisit a specific area or a robot 100 revisits the position that is the same as the specific position, or the robot 100 visits at a position adjacent to the specific position after the robot 100 visits the specific position. The robot 100 reduces uncertainty with respect to the current position through the loop closing.

Figure 2:
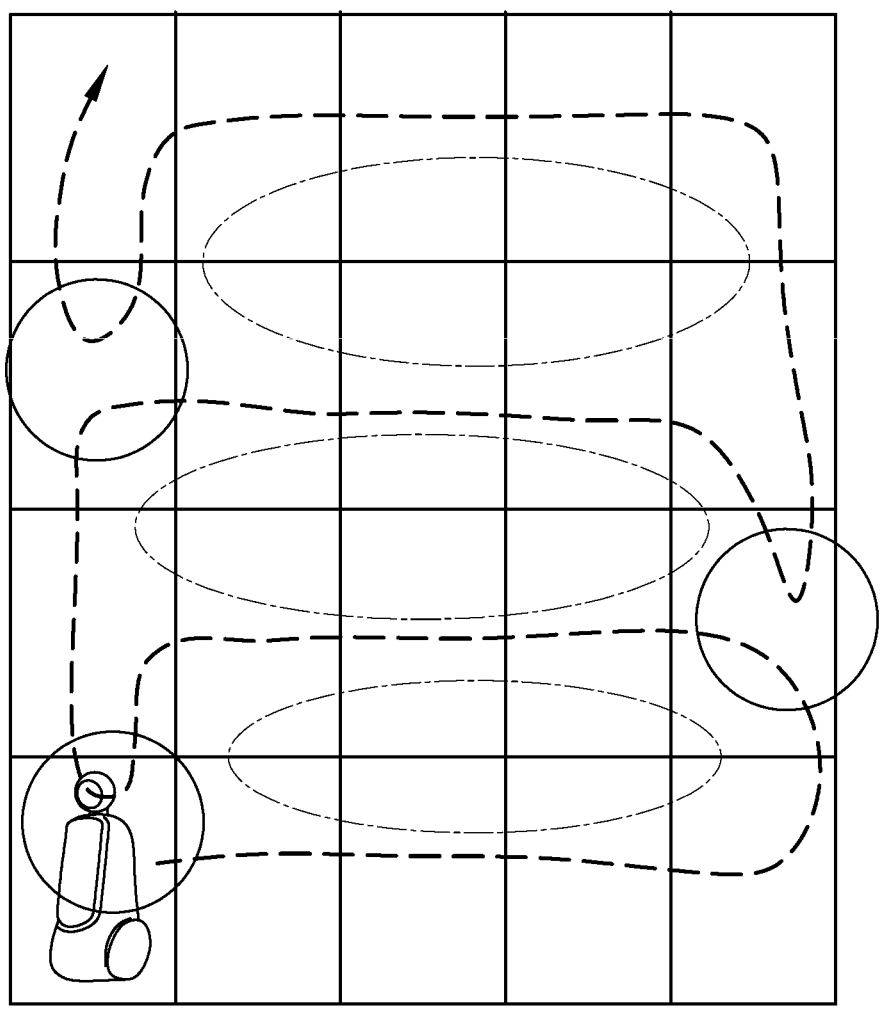
FIG. 2 shows a concept of loop closing.

FIG. 2 shows a concept of loop closing. In FIG. 2, dotted lines refer to a movement trajectory of the robot 100, circle symbols made of solid lines refer to a point where the loop closing occurs through revisit, and elliptical symbols made of alternated long and short dash lines refer to a loop. Thus, in FIG. 2, the loop closing was performed three times.

The controlling unit 160 controls the movement of the robot 100 based on the data sensed by the sensing unit 110 and controls the movement of the robot 100 based on the result of determination (that is, whether the loop closing is performed) determined by the determining unit 150.

The communication unit 170 performs a function for communicating with a user terminal device that controls the movement of the robot 100. For example, the communication unit 170 may include a near field communication module such as a Bluetooth module, an NFC module, a WIFI module, and the like, and a wide area communication module such as an LTE communication module and a 5G communication module.

Hereinafter, the movement operation of the robot 100 that draws a map of a specific area will be described in more detail with reference to the following drawings.

Figure 3:
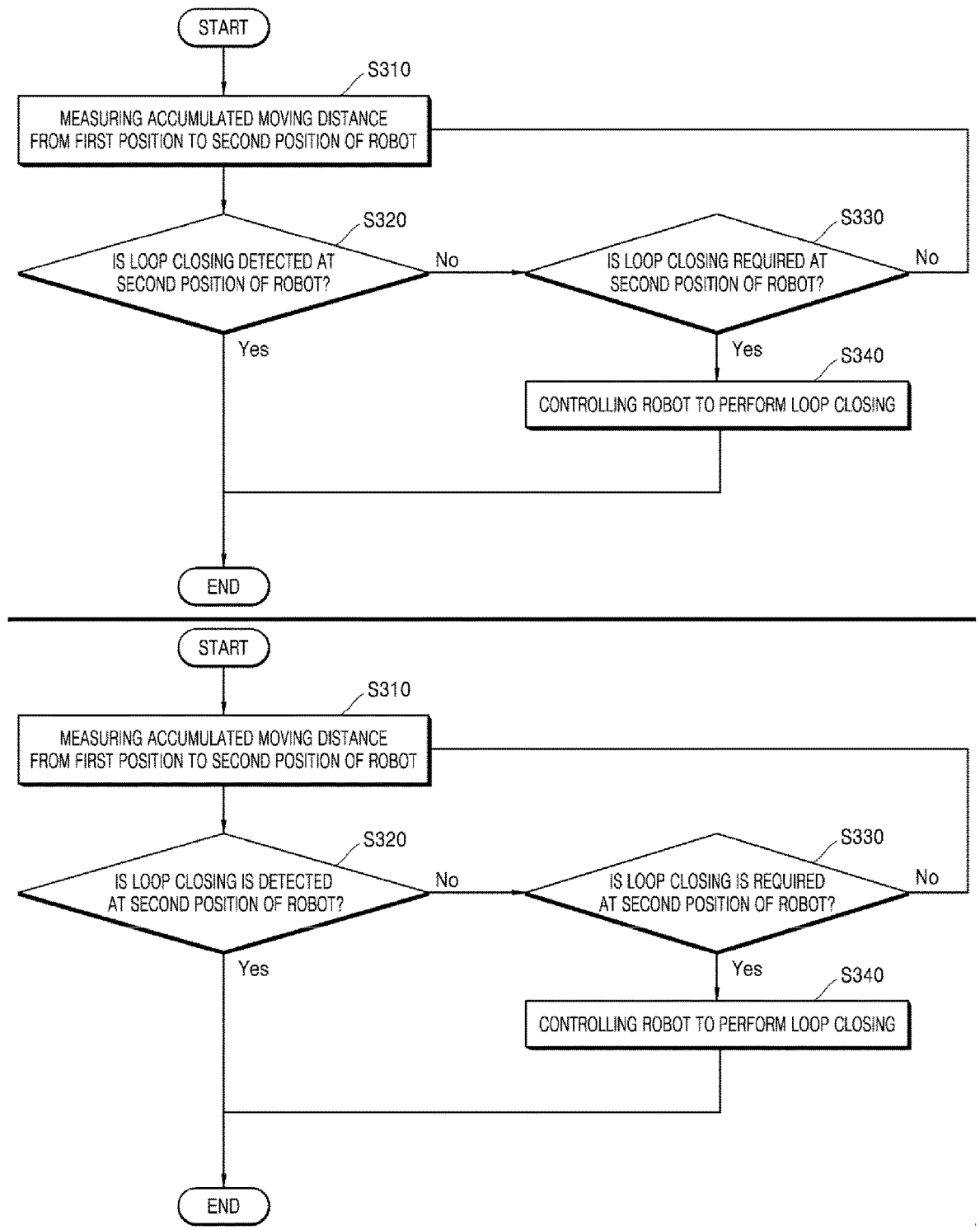
FIG. 3 and FIG. 4 are flowcharts of methods of generating maps of specific areas according to an embodiment of the present disclosure.

FIG. 3 is a flowchart of a method for drawing a map of a specific area according to an embodiment of the present disclosure.

A robot 100 may repeatedly perform steps shown in FIG. 3 while moving in a specific area, thereby newly generating a map for the specific area.

Hereinafter, a process performed for each step will be described in detail with reference to FIG. 3.

First, a distance measuring unit 130 measures an accumulated moving distance from a first position to a second position of a robot moving in a specific area (S310).

When the steps in FIG. 3 are performed for the first time, the first position of the robot 100 corresponds to an initial position of the robot 100 to be moved in the specific area. When the steps in FIG. 3 are repeatedly performed two or more times, the first position of the robot 100 corresponds to an end position of the most recently performed loop closing. A second position corresponds to a current position of the robot 100.

Meanwhile, as described above, the distance measuring unit 130 may measure the accumulated moving distance based on the data sensed by an acceleration sensor and a gyro sensor in a sensing unit 110.

Next, a determining unit 150 determines or detects whether loop closing is performed at the second position of the robot 100 (S320).

The detected loop closing may be a general loop closing performed based on a form or a shape of a surrounding environment when the robot 100 moves, or a forced loop closing described below. Meanwhile, the determining unit 150 may detect whether the loop closing is performed at the second position of the robot 100 through a known loop closing detection technology.

When the loop closing is performed at the second position of the robot 100, the steps in FIG. 3 are ended. At this time, the first position of the robot 100 in the next repetition step in FIG. 3 may be an end point of the loop closing described above.

To the contrary, when the loop closing is not performed at the second position of the robot 100, the determining unit 150 determines whether the loop closing is required at the second position of the robot 100 using the accumulated moving distance measured by the distance measuring unit 130 and the information on matching of the feature points at the second position generated by the feature point matching unit 140 (S330). At this time, the loop closing in a step (S330) is forcedly performed to improve quality of the map, unlike the general loop closing as described above.

Figure 4:
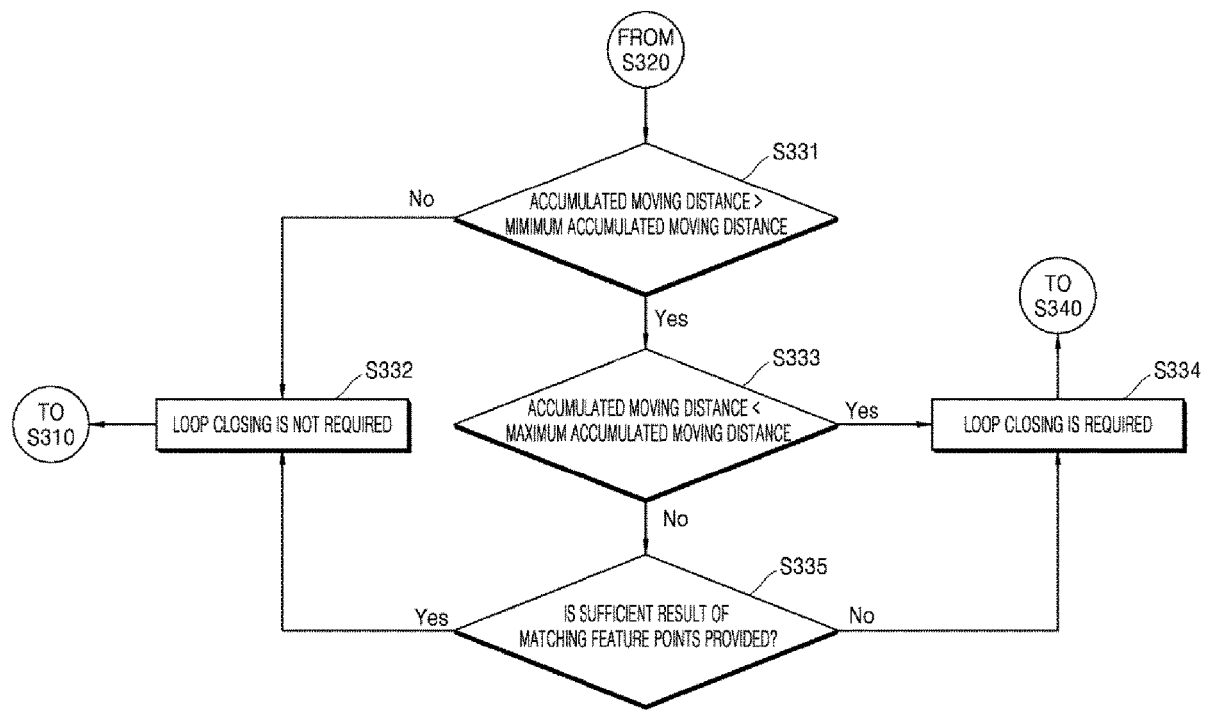

FIG. 4 is a detailed flowchart of a step (S330). Hereinafter, a process of determining, by a determining unit 150, whether forced loop closing is required at the second position of the robot 100 will be described with reference to FIG. 4.

First, the determining unit 150 determines whether an accumulated moving distance is greater than a predetermined minimum accumulated moving distance (S331).

The minimum accumulated moving distance corresponds to a minimum distance in which the robot 100 may move for loop closing, that is, a lower limit of the accumulated moving distance. For example, the minimum accumulated moving distance may be 1 m.

That is, the loop closing is performed to improve the quality of the map by revisiting, by the robot 100, a previous point. When the robot 100 performs the loop closing in a state in which the accumulated moving distance is too short, an effect of performing the loop closing may not be expected.

Accordingly, when the measured accumulated moving distance is equal to or less than the minimum accumulated moving distance, the determining unit 150 determines that loop closing is not required (S332).

Next, when it is determined that the measured accumulated moving distance is greater than the minimum accumulated moving distance, the determining unit 150 determines whether the measured accumulated moving distance is greater than a predetermined maximum accumulated moving distance (S333).

The maximum accumulated moving distance is a maximum distance that the robot 100 may move without performing loop closing, that is, a minimum distance in which the loop closing may be performed at least once. In other words, the maximum accumulated moving distance corresponds to an upper limit of the accumulated moving distance.

The maximum accumulated moving distance may be set by a user of the robot 100. For example, the maximum accumulated moving distance may be set to 20 m.

When it is determined that the measured accumulated moving distance is greater than the maximum accumulated moving distance, the determining unit 150 determines that loop closing is required at the second position of the robot 100 (S334). To the contrary, when it is determined that the measured accumulated moving distance is less than the maximum accumulated moving distance, the determining unit 150 determines whether sufficient results of matching a feature points of the robot 100 are provided (S335). To this end, the determining unit 150 compares a value associated with the information on matching of the feature points at the second position with a predetermined threshold value.

In more detail, the moving robot 100 extracts feature points based on at least one of the data sensed by a sensing unit 110 and images acquired by an image acquisition unit 120, and matches the above. At this time, when the matching result is good, it is regarded that sufficient information on a new point is provided, and in this cane, a forced loop closing may not be required.

Accordingly, even when it is determined that the measured accumulated moving distance is less than or equal to the maximum accumulated moving distance, if sufficient results of matching the feature points are provided, the determining unit 150 determines that the loop closing is not required (S332). To the contrary, when it is determined that the measured accumulated moving distance is less than or equal to the maximum accumulated moving distance, and the sufficient result of matching the feature points is not provided, the determining unit 150 determines that the loop closing is required to improve the quality of the map (S334).

Further, even when the feature point matching is well performed and sufficient result of matching the feature points is provided, the robot 100 that has moved by a predetermined distance or more may necessarily perform the loop closing to search for new point. Accordingly, when the measured accumulated moving distance is greater than the maximum accumulated moving distance, the determining unit 150 determines that the loop closing is required (S334).

In summary, when the measured accumulated moving distance is greater than the minimum accumulated moving distance and the maximum accumulated moving distance, the determining unit 150 may determine that the loop closing is required. Further, when the measured accumulated moving distance is greater than the minimum accumulated moving distance and is not greater than the maximum accumulated moving distance and sufficient result of matching the feature points is provided, the determining unit 150 may determine that the loop closing is required.

Meanwhile, a value associated with the information on matching of feature points corresponding to the result of matching the feature points may be a value of matched feature points using the image acquired by the image acquisition unit 120 or a value of matched feature points using the lidar scan data acquired by the lidar sensor.

According to an embodiment of the present disclosure, when feature point matching is performed using an image, a value associated with the information on matching of feature points may correspond to a first value (which is the number of a pair of feature point pairs matched between images)/(the number of feature points extracted from an image) or a second value that is the number of feature points matched in the images. In this case, when the first value or the second value is greater, the determining unit 150 may determine that sufficient result of matching the feature points are provided. Accordingly, when the first value is less than a first threshold value or the second value is less than a second threshold value, the determining unit 150 may determine that the loop closing is required.

Further, according to another embodiment of the present disclosure, when lidar scan data is used, the value associated with the information on matching of the feature points may correspond to average value of accumulated distance difference in an overlapping area of the lidar scan data to be matched. At this time, when the average value of accumulated distances corresponding to distance differences is less, the determining unit 150 may determine that sufficient result of matching the feature points are provided. For example, when there are many dynamic obstacles in a certain area, there is a possibility that the average value of accumulated distances corresponding to distance differences becomes greater. Accordingly, when the average value of accumulated distances corresponding to distance differences is greater than a predetermined third threshold value, the determining unit 150 may determine that the loop closing is required.

A moving operation of the robot 100 of the present disclosure will be described again with reference to FIG. 3.

When it is determined that the loop closing is not required in S330, S310 is performed. Thus, the accumulated moving distance from the first position to the current position (a second position) is continually measured.

When it is determined that the loop closing is required in S330, the controlling unit 160 controls the robot 100 to perform the loop closing (S340). At this time, the controlling unit 160 may control the robot 100 to move to the first position, and in particular, the controlling unit 160 may move the robot 100 to the first position so that a distance difference between the first position and the second position (the current position) of the robot 100 is minimized.

In brief, according to the present disclosure, the robot 100 mainly aims at accurately generating a map for a specific area, and may determine whether the loop closing is performed based on the result of matching the feature points provided by the robot 100, and may determine whether the loop closing is performed based on the accumulated moving distance of the robot 100.

That is, when the loop closing is performed many times, the quality of the map is improved, but a time that is consumed to draw the map, by the robot 100, is increased. When the loop closing is performed in less time, a time that is consumed to draw the map, by the robot 100, is decreased, but the sufficient result of matching of the feature points is not provided, thereby deteriorating the quality of the map.

Accordingly, according to the present disclosure, the robot 100 may determine whether the sufficient result of matching the feature points is provided. When the sufficient result of matching the feature points are provided, forced loop closing is not performed, and when the sufficient result of matching the feature points is not provided, the forced loop closing may be performed. Accordingly, the robot 100 may improve the quality of the map while appropriately performing the loop closing based on properties of the map.

Meanwhile, as described above, the feature point matching unit 140 may perform the feature point matching using an algorithm model based on an artificial neural network. This will be described in more detail as follows.

Artificial intelligence (AI) is a field of computer engineering and information technology to study a method of thinking, learning, and self-developing, by a computer, which may be performed based on intelligence of human, and may refer to enabling for the computer to emulate intelligent behaviors of human.

AI does not exist by itself, but directly or indirectly has much association with other fields of computer science. Especially, today, attempts of introducing an element with respect to artificial intelligence in various types of fields of information technology to use it in the solving of the problem in that field are actively made.

Machine learning is a field of AI, and is a field of study that provides computers with an ability to learn without explicit program.

Specifically, the machine learning is a technology that studies and builds a system that performs learning based on empirical data and performs prediction, and improves performance and algorithm for such a system. Machine learning algorithms are not configured to perform strictly determined static program commands but use a method of building a specific model to derive the prediction or decision based on input data.

Many machine learning algorithms have been developed on how to classify data in the machine learning. Decision Tree, Bayesian network, support vector machine (SVM), and Artificial Neural Network (ANN) are general examples thereof.

In particular, an artificial neural network is made by modeling an operation principle of biological neurons and connection between neurons and is an information processing system in which nodes or multiple neurons which are processing elements are connected in a form of a layer structure.

In other words, the artificial neural network is a model used in the machine learning and is a statistical learning algorithm that is inspired by biological neural networks (particularly, a brain of a central nervous system of animals) in machine learning and cognitive science.

Specifically, the artificial neural network may include a plurality of layers, and each of the layers may include a plurality of neurons. Further, artificial neural networks may include synapses that connect neurons. That is, the artificial neural network may refer to a whole model in which an artificial neuron that forms a network by connection of synapses changes a binding intensity of the synapse through learning and has a problem solving capability.

The term 'artificial neural network' and the term 'neural network' may be used interchangeably, and the term 'neuron' and the term 'node' may be used interchangeably, and the term 'synapse' and the term 'edge' may be used interchangeably.

The artificial neural network may be generally defined by following three factors: (1) a pattern of connections between neurons in different layers, (2) a learning process to update weights of synapses, (3) an activation function that generates an output value from a weighted sum of inputs received from previous layers.

The artificial neural network may include network models such as Deep Neural Network (DNN), Recurrent Neural Network (RNN), Bidirectional Recurrent Deep Neural Network (BRDNN), Multilayer Perceptron (MLP), Convolutional Neural Network (CNN), but is not limited thereto.

Artificial neural networks are classified into single-layer neural networks and multi-layer neural networks according to the number of layers.

A general single-layer neural network includes an input layer and an output layer.

Further, a general multi-layer neural network includes an input layer, one or more hidden layers, and an output layer.

The input layer accepts external data. The number of neurons in the input layer is equal to the number of input variables.

The hidden layer is placed between the input layer and the output layer, and receives signals from the input layer, and extracts properties, and transfers the extracted properties to the output layer.

The output layer receives the signal from the hidden layer and outputs the output value based on the received signal. The input signal between the neurons is multiplied by each weight (connection strength) and then summed. When the sum is greater than the threshold value of the neuron, the neuron is activated to output the output value obtained through the activation function.

Meanwhile, a deep neural network including a plurality of hidden layers between the input layer and the output layer may be a representative artificial neural network that implements deep learning, which is one type of machine learning technology.

Artificial neural networks may be trained using training data. Training may refer to a process of determining parameters of the artificial neural network based on training data, to perform classification, regression, clustering, and the like, with respect to input data. Synaptic weights or bias applied to neurons are representative examples of parameters of the artificial neural network.

The artificial neural network trained by the training data may perform classification or clustering with respect to the input data according to a pattern of the input data. Meanwhile, the artificial neural network trained based on the training data may be referred to as "a trained model" in the present disclosure.

A learning method of artificial neural networks will be described as follows.

The learning method of artificial neural networks may be classified into supervised learning, unsupervised learning, semi-supervised learning, and reinforcement learning.

The supervised learning is a method of machine learning to derive a function from the training data. At this time, among the inferred functions, outputting successive values is referred to as "a regression", and predicting a class of an input vector and outputting it is referred to as "a classification". That is, in the supervised learning, the artificial neural network is learned when a label for the training data is provided. The label refers to a correct answer (or a result value) to be inferred by the artificial neural network when the training data is input to the artificial neural network.

The unsupervised learning is a kind of machine learning, and the label for the training data is not provided. Specifically, the unsupervised learning is a learning method in which the artificial neural network is learned to find and classify patterns in the training data itself, rather than association between the training data and labels corresponding to the training data.

The semi-supervised learning is a kind of machine learning, which may refer to a learning method that uses both training data in which the label is provided and the training data in which the label is not provided. One example of techniques of semi-supervised learning is performing the learning using the inferred labels after the label of the training data in which the label is not provided is inferred. This technique may be useful when cost required for labeling is high.

Reinforcement learning has a theory that the best path may be found empirically without data when an environment in which an agent may determine which action the agent may perform every moment is provided.

Referring to the above matter, according to the present disclosure, the algorithm model based on the artificial neural network for feature point matching includes an input layer that includes input nodes, an output layer that includes output nodes, and one or more hidden layers that are disposed between the input layer and the output layer and includes hidden nodes. At this time, the algorithm model may be learned by the learning data, and weights of edges connecting the nodes and the bias of the node may be updated through learning.

According to an embodiment of the present disclosure, the learned algorithm model may be in the feature point matching unit 140. At this time, at least one of sensing data sensed at different time points from each other and information on feature points included in images acquired at different time points from each other is input to the input layer of the learned algorithm model, and the information on matching of feature points may be output to the output layer of the learned algorithm model.

Further, according to another embodiment of the present disclosure, the learned algorithm model may be in an external AI server. In this case, the feature point matching unit 140 transmits, through the communication unit 170, at least one of the sensing data sensed at different time points from each other and the information on the feature points included in the images acquired at different time points to the AI server. At least one of the sensing data sensed at different time points from each other and the information on the feature points included in the images acquired at different time points from each other are input to the input layer of the learned algorithm model of the AI server, and information on matching of the feature points may be output to the output layer of the learned algorithm model. The AI server may transmit the information on matching the output feature points to the feature point matching unit 140 via the communication unit 170, and the feature point matching unit 140 may match the feature points.

Meanwhile, the control of the movement of the robot 100 may be performed in conjunction with a user terminal device that controls the movement of the robot 100. That is, the robot 100 may control the movement on its own, but the movement of the robot may be controlled by the user having the user terminal device.

Figure 5:
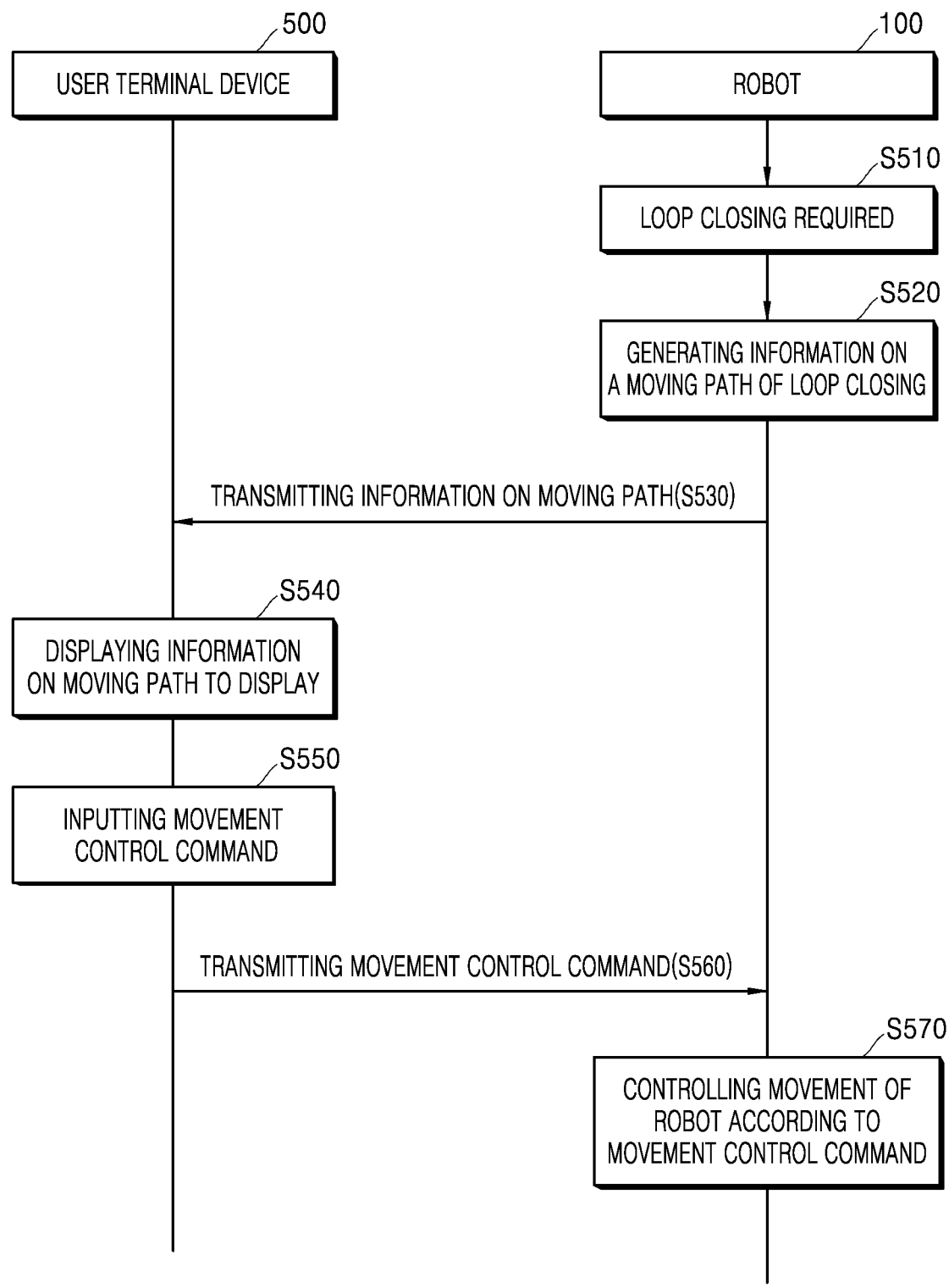
FIG. 5 is a flowchart of controlling an operation of a movement of a robot performed in cooperation with a user terminal device according to an embodiment of the present disclosure.

FIG. 5 shows a flowchart of controlling an operation of movement of a robot 100 performed in cooperation with a user terminal device.

Referring to FIG. 5, when a determining unit 150 determines that forced loop closing is required (S510), a controlling unit 160 generates information on a moving path of loop closing (S520) and the generated information on moving path is transmitted to a user terminal device 500, through a communication unit 170 (S530).

Thereafter, the user terminal device 500 displays the received information on moving path on a display (S540) and receives a movement control command to control the moving path of the robot 100 from the user through a joystick, and the like (S550), and transmits the input movement control command to the robot 100 (S560).

The robot 100 that has received the movement control command through the communication unit 170 controls the movement of the robot 100 according to the movement control command through the controlling unit 160 (S570).

In summary, when forced loop closing is performed, a robot 100 may provide the user terminal device 500 with the information on the moving path of the loop closing to guide the movement of the robot 100 to the user.

Hereinafter, an example of a moving operation of a robot 100 described above will be described in detail with reference to FIGS. 6 and 7. At this time, for convenience of explanation, it is described that the robot 100 performs movement control by itself.

Figure 6:
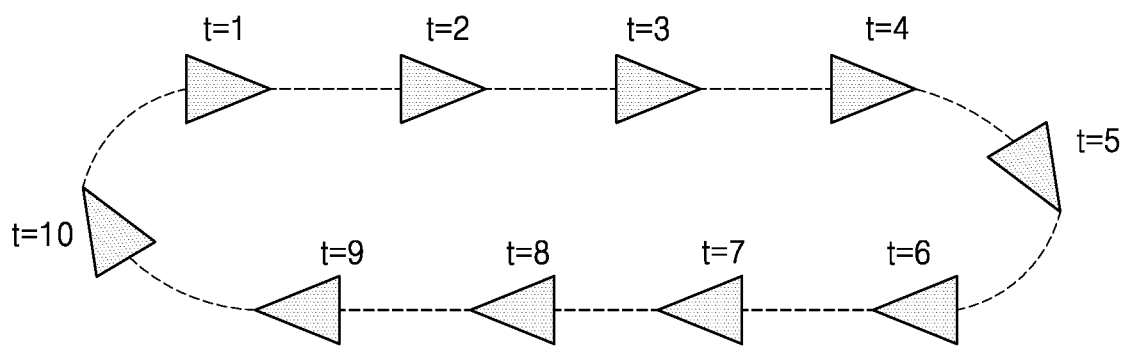
FIGS. 6 and 7 show examples of moving operation of robots according to an embodiment of the present disclosure.
Figure 7:
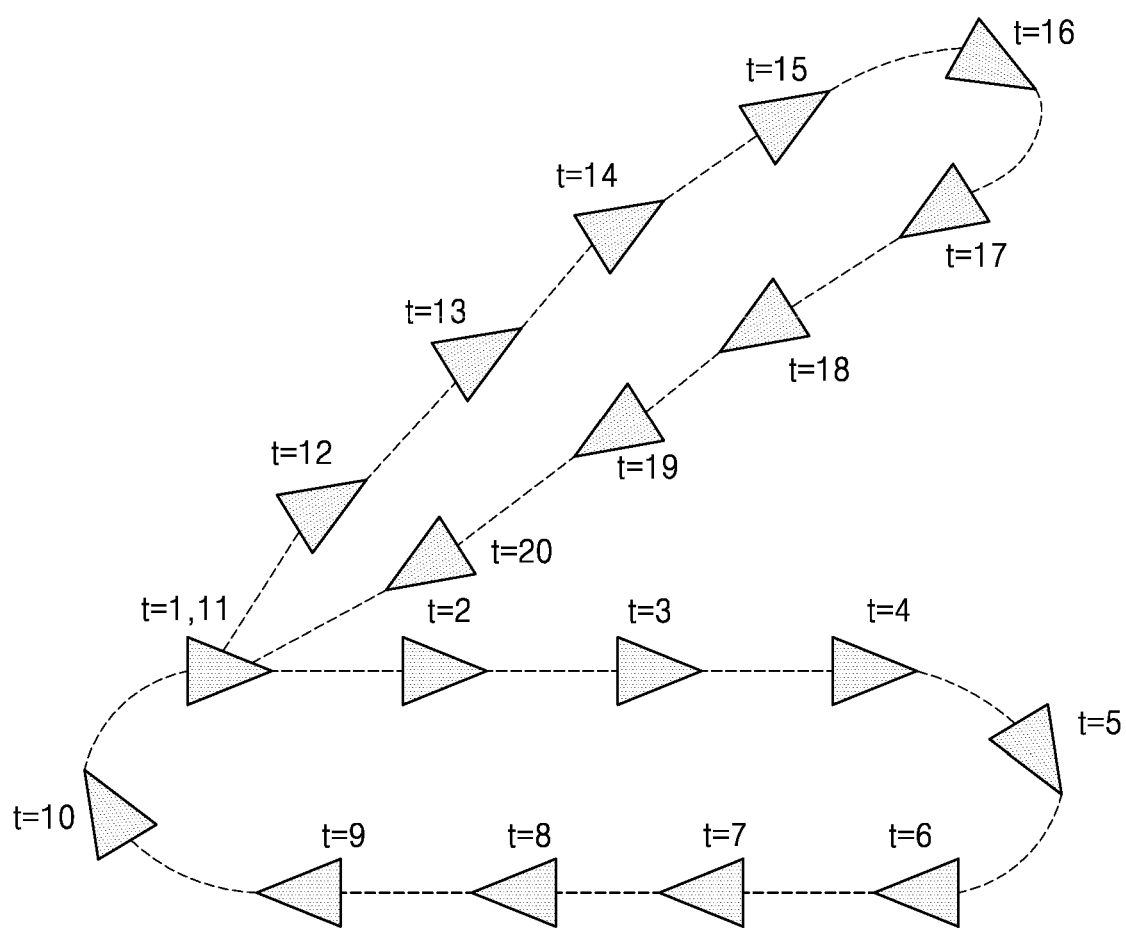

In FIGS. 6 and 7, a point of "t=1" refers to a first position. It is assumed that a minimum accumulated moving distance is set to be 1 m, and a maximum accumulated moving distance is set to be 20 m, and a distance between each point t is 5 m, and sufficient results of matching the feature points are not provided at each point.

First, referring to FIG. 6, the robot 100 has moved from the point of "t=1" to a point of "t=5" without performing the loop closing, and the accumulated moving distance exceeded 20 m from the point of "t=1" to the point of "t=5".

Therefore, a determining unit 150 determines that forced loop closing is required at the point of "t=5", and accordingly, a controlling unit 160 controls the movement of the robot 100 to be returned to the point of "t=1" as shown in FIG. 6. At this time, the controlling unit 160 moves the robot 100 to the point of "t=1" so that the difference in distance between the point of "t=1" and the point of "t=5" of the robot 100 is minimized.

Next, referring to FIG. 7, the robot 100 moves in a specific direction at a point of "t=11" identical to the point of "t=1", and has moved until "t=15" without performing of loop closing, the accumulated moving distance exceeded 20 m from the point of "t=11" to the point of "t=15".

Therefore, the determining unit 150 determines that forced loop closing is required at the point of "t=15", and accordingly, the controlling unit 160 controls the movement of the robot 100 so that the robot is returned to the point of "t=11", as shown in FIG. 7. At this time, the controlling unit 160 moves the robot 100 to the point of "t=11" so that the distance difference between the point of "t=11" and the point of "t=15" is minimized.

In brief, according to the present disclosure, the robot 100 is used when a map of a specific area is drawn, and may generate and update maps based on the SLAM and appropriately adjust the number of the loop closing performed to improve quality of the map.

At this time, when the map of the specific area is first created, the robot 100 may be placed in the specific area, thereby automatically generating the map without previously input information.

According to the present disclosure, the robot 100 may also be used even when there is an error in a portion of or all maps in the state in which the map is generated, or when the generated map is periodically updated. In particular, when an error occurs in only a portion of the map or when a portion of the map is not generated, the map may be efficiently amended or updated by placing the robot 100 only in a certain area.

Further, according to the present disclosure, although the robot 100 may be applied to a small area, the robot 100 may be used more efficiently in a large area such as a public place. That is, in the case of the small area, as the position of the obstacle is almost fixed, the map may not be periodically updated. However, in the case of the large area such as a public institution, the position of the obstacle varies significantly, and thus, the map may be periodically updated. In particular, robots moving in large areas generally may not revisit or rarely revisit. Therefore, according to the present disclosure the robot 100 may be efficiently used to generate or update the map in the large area.

Further, when the moving path of the robot 100 is controlled in cooperation with the user terminal device 500, as described above, the robot 100 may provide the information on the movement path of the loop closing to the user terminal device 500, and may guide the movement of the robot 100 to the user. Accordingly, the user which is a non-expert may accurately draw the map of the specific area.

That is, when the user draws the map by manually controlling the robot using a terminal device in which a joystick and the like are attached, the user may know an ideal trajectory of the robot so that the accurate map may be drawn. However, as the non-expert user does not know the ideal trajectory, accuracy of the generated map is degraded. Meanwhile, in the case of a robot in which an expensive sensor (for example, a 360° camera and a 3D-rider sensor) is attached, the non-expert user may draw the accurate map, but the robot is expensive. However, when the robot 100 of the present disclosure is used, a user who is the non-expert may draw the accurate map even without using the robot in which the expensive sensor is attached.

Meanwhile, the method for drawing the map of the specific area described in FIGS. 3 and 4 may be used for electronic devices carried by a user.

Figure 8:
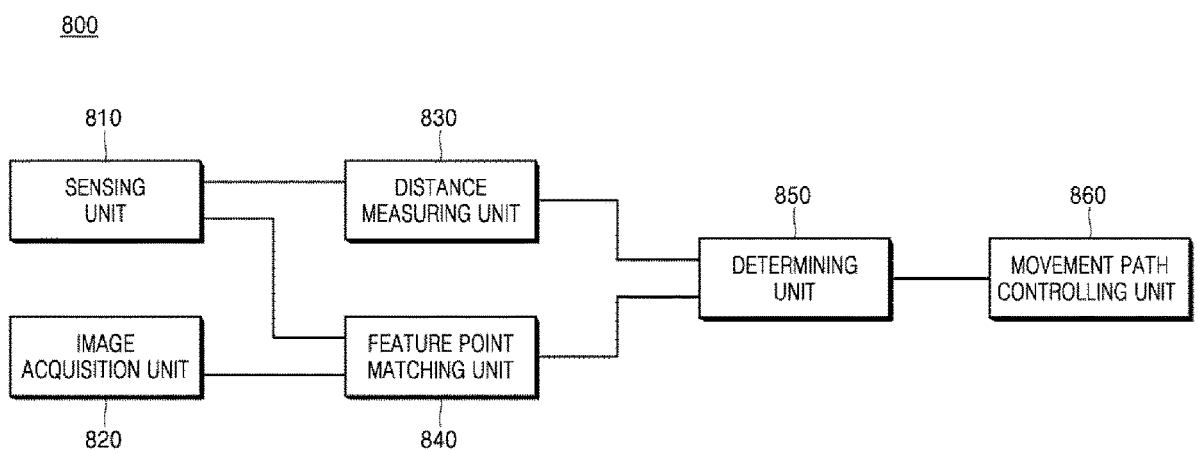
FIG. 8 shows a schematic configuration of an electronic device according to an embodiment of the present disclosure.

FIG. 8 shows a schematic configuration of an electronic device according to an embodiment of the present disclosure.

Referring to FIG. 8, according to an exemplary embodiment of the present disclosure, an electronic device 800 includes a sensing unit 810, an image acquisition unit 820 (or image acquirer), a distance measuring unit 830 (or distance measurer), a feature point matching unit 840 (or feature point matcher), a determining unit 850 (or determiner), and a movement path controlling unit 860 (or controller).

Meanwhile, the electronic device 800 may have a shape of a back pack and may have all components of the electronic device 800 are disposed in the back pack and may be a mobile device the user may grip with hands. When the electronic device 800 has the form of the back pack, the electronic device 800 is operated in cooperation with a terminal device the user grips with hands.

Hereinafter, function of each component will be described in detail.

The sensing unit 810 includes a plurality of sensors.

The image acquisition unit 820 acquires an image of a surrounding environment when the user moves in a specific area.

The distance measuring unit 830 measures the accumulated moving distance of the robot moving in the specific area.

The feature point matching unit 840 generates the information on matching of feature points based on at least one of the sensed data sensed by the sensing unit 810 and the image acquired by the image acquisition unit 820, and matches the feature points based on the generated information on matching of feature points.

The determining unit 850 determines whether loop closing is performed at a current position of the user, and determines whether the loop closing is required when the loop closing is not performed at the current position.

Meanwhile, the configurations of the sensing unit 810, the image acquisition unit 820, the distance measuring unit 830, the feature point matching unit 840 and the determining unit 850 are the same as the sensing unit 110, the image acquisition unit 120, the distance measuring unit 130, the feature point matching unit 140, and the determining unit 150 described above, and hereinafter, details will be omitted.

When it is determined that the loop closing is required, the movement path controlling unit 860 generates information on a moving path of the loop closing.

When the electronic device 800 has a form of back pack, the information on the moving path is transmitted to the terminal device through the communicator included in the electronic device, and the terminal device displays the information on the moving path to the user. The user may identify information on the moving path displayed on the terminal device and may move for loop closing.

Alternatively, when the electronic device 800 is a mobile device, the electronic device 800 displays the information on the moving path, generated by the display, to the user, and the user identifies the information on the moving path displayed on the display of the electronic device 800 to move for loop closing.

In brief, the user who carries the electronic device 800 moves directly in the specific area, and the electronic device 800 draws the map of the area. At this time, when the loop closing is required, the electronic device 800 provides the information on the moving path of the loop closing to the user, and the user identifies the received information on the moving path and performs the movement. Therefore, according to the present embodiment, an accurate map may be drawn at a place where the robot may not enter or travel (for example, stairs and the like).

Although components included in the embodiment of the present disclosure are described as being combined to one, or as being operated to operate, the present disclosure is not necessarily limited to such an embodiment, and these components may operate by being selectively combined to one or more within the purpose range of the present disclosure. Further, although all of the components may be implemented as an independent hardware, a part or all of each of the components may be selectively combined to be implemented as a computer program that has a program module that performs a part or all of the function combined in one or a plurality of hardware. The codes and the code segments that form the computer program will be easily deduced by those skilled in the art of the present disclosure. Such a computer program can be stored in a computer readable media that a computer can read, and can be read and implemented by the computer to implement the embodiment of the present disclosure. As the storage medium of the computer program, it may include a storage media including a semiconductor recording element, an optical recording media, and a magnetic recording media. Further, a computer program that implements the embodiment of the present disclosure may include a program module that is transmitted in real time via an external apparatus While the present disclosure has been described with reference to exemplary embodiments of the present disclosure, various modifications and changes can be made at a level of the skilled person in the art. Thus, unless the modifications and changes do not deviate from a scope of the present disclosure, it is to be understood that the modifications and changes are included in the scope of the present disclosure.

What is claimed is:

1. A robot for drawing a map of a specific area, the robot comprising:
   a distance measurer configured to measure an accumulated moving distance of the robot moving in the specific area from a first position to a second position;
   a feature point matcher configured to perform feature point matching;
   a determiner configured to determine whether loop closing is required at the second position based on:
       the measured accumulated moving distance, and
       information on matching of feature points at the second position; and
   a controller configured to control movement of the robot based on a result determined by the determiner,
   wherein the determiner is configured to determine that the loop closing is required when the measured accumulated moving distance is greater than a predetermined maximum accumulated moving distance.

2. The robot of claim 1, wherein the first position is an initial position of the robot in the specific area or an end position of a loop closing which is most recently performed, and
   wherein the second position is a current position of the robot.

3. The robot of claim 1, wherein the controller is further configured to control the robot to move from the second position to the first position when the determiner determines that the loop closing is required.

4. The robot of claim 1, wherein the determiner is further configured to, when the measured accumulated moving distance is greater than a predetermined minimum accumulated moving distance and is not greater than the predetermined maximum accumulated moving distance:
   compare a value associated with the information on matching of feature points at the second position and a predetermined threshold value, and
   determine whether the loop closing is required.

5. The robot of claim 4, further comprising an image acquirer configured to acquire an image when the robot moves,
   wherein the value associated with the information on matching of the feature points corresponds to a number of pairs of matching feature points between images divided by a number of feature points extracted from the images, or corresponds to the number of matching feature points in the images, and wherein the determiner is configured to determine that the loop closing is required when the value associated with the information on matching of the feature points is less than the predetermined threshold value.

6. The robot of claim 4, further comprising a lidar sensor configured to measure a distance between the robot and an object, wherein the value associated with the information on matching of the feature points corresponds to an average value of accumulated distance differences in an overlapping area of a lidar scan data, and wherein the determiner is configured to determine that the loop closing is required when the value associated with the information on matching of the feature points is greater than the predetermined threshold value.

7. The robot of claim 1, further comprising a communicator configured to communicate with a user terminal that controls movement of the robot, wherein the controller is further configured to, when the determiner determines that the loop closing is required, generate information on a moving path of the loop closing, wherein the communicator is configured to:
transmit the generated information on the moving path to the user terminal, and
receive a movement control command of the robot corresponding to the generated information on the moving path from the user terminal, and wherein the controller is further configured to control the movement of the robot according to the movement control command of the robot.

8. The robot of claim 1, wherein the feature point matcher is configured to perform feature point matching using an algorithm model based on an artificial neural network, and wherein the algorithm model comprises:
an input layer comprising an input node,
an output layer comprising an output node, and
one or more hidden layers disposed between the input layer and the output layer and comprising a hidden node,
wherein a weight of an edge that connects nodes and a bias of the nodes are updated through learning.

9. The robot of claim 8, wherein at least one of sensing data sensed at different time points from each other and information on feature points in images acquired at different time points from each other is input to the input layer of the learned algorithm model, and wherein the information on matching of the feature points is output to the output layer of the learned algorithm model.

10. A method of drawing, by a robot, a map of a specific area, the method comprising:

measuring, by a distance measurer, an accumulated moving distance of the robot moving in the specific area from a first position to a second position;

matching, by a feature point matcher, feature points in the specific area;

determining, by a determiner, whether loop closing is required at the second position based on:
the measured accumulated moving distance, and
information on matching of a feature point at the second position; and controlling, by a controller, a movement of the robot based on a result determined by the determiner, wherein the determining whether the loop closing is required at the second position is performed when the measured accumulated moving distance is greater than a predetermined maximum accumulated moving distance.

11. The method of drawing of claim 10, wherein the first position is an initial position of the robot in the specific area or an end position of a loop closing which is most recently performed, and wherein the second position is a current position of the robot.

12. The method of drawing of claim 10, wherein the determining whether the loop closing is required at the second position includes, when the measured accumulated moving distance is greater than a predetermined minimum accumulated moving distance and is not greater than the predetermined maximum accumulated moving distance:

comparing a value associated with the information on matching of the feature point at the second position with a predetermined threshold value; and determining whether the loop closing is required.

* * * * *